(12) United States Patent
Hess

(10) Patent No.: US 7,613,769 B1
(45) Date of Patent: Nov. 3, 2009

(54) METHODS AND SYSTEMS FOR PROVIDING BLOG INFORMATION ASSOCIATED WITH A MEMBER OF A SOCIAL NETWORK

(75) Inventor: Duane Scott Hess, Cupertino, CA (US)

(73) Assignee: Google Inc., Mountain View, CA (US)

( * ) Notice: Subject to any disclaimer, the term of this patent is extended or adjusted under 35 U.S.C. 154(b) by 686 days.

(21) Appl. No.: 10/954,146

(22) Filed: Sep. 30, 2004

(51) Int. Cl.
*G06F 15/16* (2006.01)
*G06F 7/00* (2006.01)

(52) U.S. Cl. .................. 709/203; 709/205; 707/5

(58) Field of Classification Search ............ 709/203, 709/204, 217, 218, 219, 227, 228, 223; 707/1, 707/3, 5, 8, 100
See application file for complete search history.

(56) References Cited

U.S. PATENT DOCUMENTS

| | | | | |
|---|---|---|---|---|
| 5,950,200 | A * | 9/1999 | Sudai et al. | 707/9 |
| 5,963,951 | A * | 10/1999 | Collins | 707/102 |
| 6,052,122 | A * | 4/2000 | Sutcliffe et al. | 715/751 |
| 6,061,681 | A * | 5/2000 | Collins | 707/5 |
| 6,073,105 | A * | 6/2000 | Sutcliffe et al. | 705/1 |
| 6,256,648 | B1 | 7/2001 | Hill et al. | |
| 6,334,541 | B1 * | 1/2002 | Chang | 211/88.01 |
| 6,366,962 | B1 * | 4/2002 | Teibel | 709/245 |
| 6,389,372 | B1 | 5/2002 | Glance et al. | |
| 6,594,673 | B1 | 7/2003 | Smith et al. | |
| 7,069,308 | B2 * | 6/2006 | Abrams | 709/218 |
| 7,433,876 | B2 * | 10/2008 | Spivack et al. | 707/100 |

(Continued)

FOREIGN PATENT DOCUMENTS

JP   11265369   9/1999

(Continued)

OTHER PUBLICATIONS

"About Multiply" [online], Copyright 2004, 2 pp., Retrieved from the Internet: http://multiply.com/info/about; printed May 3, 2004.

(Continued)

*Primary Examiner*—Ario Etienne
*Assistant Examiner*—Sargon N Nano
(74) *Attorney, Agent, or Firm*—Fenwick & West LLP

(57) ABSTRACT

Methods and systems for providing hyperlinks to blogs that are maintained by members of a social network who have a particular association or relationship with a member of the social network in response to a request are described. A request for blog information may come from a member of the social network or from non-members. In order to gather the blog information, an association type (or association) associated with the request may be identified by a software application. After identifying the association, members of the social network who have the identified association with the member of interest may be identified using profile information associated with the member of interest. Once members having the identified association with the member of interest are identified, blog information for each identified member may be determined. Once the blog information is identified, a representation of the blog information (for example, a text-based display with hyperlinks) may be generated. The representation may then be displayed on a client device associated with the person who requested the blog information.

21 Claims, 3 Drawing Sheets

U.S. PATENT DOCUMENTS

| | | | |
|---|---|---|---|
| 2002/0116466 A1 | 8/2002 | Trevithick et al. | |
| 2002/0124053 A1 | 9/2002 | Adams et al. | |
| 2003/0050977 A1 | 3/2003 | Puthenkulam et al. | |
| 2004/0042599 A1 | 3/2004 | Zaner et al. | |
| 2004/0088325 A1 | 5/2004 | Elder et al. | |
| 2004/0122803 A1 | 6/2004 | Dom et al. | |
| 2005/0256866 A1* | 11/2005 | Lu et al. | 707/5 |
| 2006/0004691 A1* | 1/2006 | Sifry | 707/1 |
| 2006/0200443 A1* | 9/2006 | Kahn et al. | 707/1 |
| 2008/0319993 A1* | 12/2008 | Lunenfeld | 707/5 |

FOREIGN PATENT DOCUMENTS

| | | |
|---|---|---|
| JP | 2002132604 | 5/2002 |
| WO | WO 00/68860 | 11/2000 |

OTHER PUBLICATIONS

"Help" [online], Copyright 2004, 2 pp., Retrieved from the Internet: http://multiply.com/info/help; printed May 3, 2004.

Harper, Phillipp, "Is Friendster the 'Next Big Thing'?" [online], Copyright 2004, 2 pp., Retrieved from the Internet: http://mobilemomentum.msn.com/article.aspx?aid=4; printed Jul. 29, 2004.

Sullivan, Danny, "Is It Really Personalized Search?"[online],5 pp., Retrieved from the Internet: http://www.searchenginewatch.com; printed May 13, 2004.

"Listings Directory" [online], 2 pp., Retrieved from the Internet: http://www.tribe.net/tribe/servlet/template/pub,Listings.vm; printed Jun. 28, 2004.

"Multiply Privacy Policy"[online], Copyright 2004, 4 pp., Retrieved from the Internet: http://multiply.com/info/privacy; printed May 3, 2004.

"Multiply Terms of Service"[online], Copyright 2004, 6 pp., Retrieved from the Internet: http://multiply.com/info/tos; printed May 3, 2004.

"Running Notes From Revenge of the User: Lessons From Creator/User Battles" [online], Feb. 11, 2004, 5 pp., Retrieved from the Internet: http://craphound.com/danahetcon04.txt; printed Jul. 28, 2004.

Adamic, A., et al., "A Social Network Caught in the Web" [online], Retrieved from the Internet: http://firstmonday.org/issues/issue8_6/adamic/; printed Jul. 28, 2004.

Balabanović, M. et al., "Content-Based, Collaborative Recommendation," Communications of the ACM, Mar. 1997, pp. 66-72, vol. 40, No. 3.

Kautz, H. et al., "ReferralWeb: Combining Social Networks and Collaborative Filtering," Communications of the ACM, Mar. 1997, pp. 1-4, vol. 40, No. 3.

Resnick, P. et al., "Recommender Systems," Communications of the ACM, Mar. 1997, pp. 56-58, vol. 40, No. 3.

Rucker, J. et al., "Siteseer: Personalized Navigation for the Web," Communications of the ACM, Mar. 1997, pp. 73-75, vol. 40, No. 3.

* cited by examiner

METHODS AND SYSTEMS FOR PROVIDING BLOG INFORMATION ASSOCIATED WITH A MEMBER OF A SOCIAL NETWORK

FIELD OF THE INVENTION

The invention generally relates to social networks. More particularly, the invention relates to methods and systems for providing blog information associated with at least one member of a social network.

BACKGROUND

Conventional associated members networks, e.g., social networks, can provide profile information associated with at least one member in the social network. In some of these networks, the member profile information can include blog information associated with the member. A "blog" is short for web log and can be a member's personal journal that is accessible to others. The author of a blog can include, inter alia, political commentary, views on products, favorite websites, personal thoughts, etc. Generally, these networks require a member to access another member's profile to obtain blog information associated with that member. Thus, for a member with a large number of friends, the member must access each of his or her friend's profiles to obtain each member's blog information. In addition, when a user, either a member of the social network or a non-member of the social network, is invited to become a friend of a member in the social network, the invited user may or may not know anything about the inviting member or member's friends and thus, may decline the offer as a result.

SUMMARY

Embodiments of the present invention comprise systems and methods for providing blog information associated with at least one member of a social network. One embodiment of the present invention comprises receiving a request for blog information associated with a first member of a social network, identifying an association criterion associated with the request, the association criterion defining at least one relationship between the first member of the social network and at least one other member of the social network, identifying one associated member of the social network meeting the association criterion, identifying blog information associated with at least one associated member, and generating a representation of the blog information.

This exemplary embodiment is mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention comprise methods and systems for providing blog information associated with a member of a social network. Members of a social network may maintain blogs. One illustrative embodiment provides a method for providing hyperlinks to blogs that are maintained by members of the social network who have a particular association or relationship with a member of the social network in response to a request. In addition to, or instead of, hyperlinks to blogs, other blog information may be provided. A request for blog information may come from a member of the social network or from non-members. For example, a request for blog information may come from a member who has been invited to become the "friend" of another member or may come from a non-member who has been invited by a member to join the network or a group within the network. These invitees may wish to examine the blogs of those associated with the inviting member before the invitees accept the invitation. Examples of associations are friends, friends of friends, business associations, and community associations. Thus, for example, the invitees may find it useful to examine the blogs of the inviting member's friends and friends of friends before deciding whether to accept the invitation. In order to gather the blog information, an association type (or association) associated with the request may be identified by a software application. For example, the requestor (for example, one of the invitees mentioned above), may designate one or more association types of interest (for example, "friends" and "friends of friends"). After identifying the association, members of the social network who have the identified association with the member of interest may be identified using profile information associated with the member of interest. For example, a list of members who have specified associations with the member of interest may be listed in the profile of the member of interest. Once members having the identified association with the member of interest are identified, blog information for each identified member may be determined. Examples of blog information includes links to the blogs, RSS feeds of the blogs, or any combination thereof. Once the blog information is identified, a representation of the blog information (for example, a text-based display with hyperlinks) may be generated. The representation may then be displayed on a client device associated with the person who requested the blog information.

This introduction is given to introduce the reader to the general subject matter of the application. By no means is the invention limited to such subject matter. Exemplary embodiments are described below.

System Architecture

Figure 1:
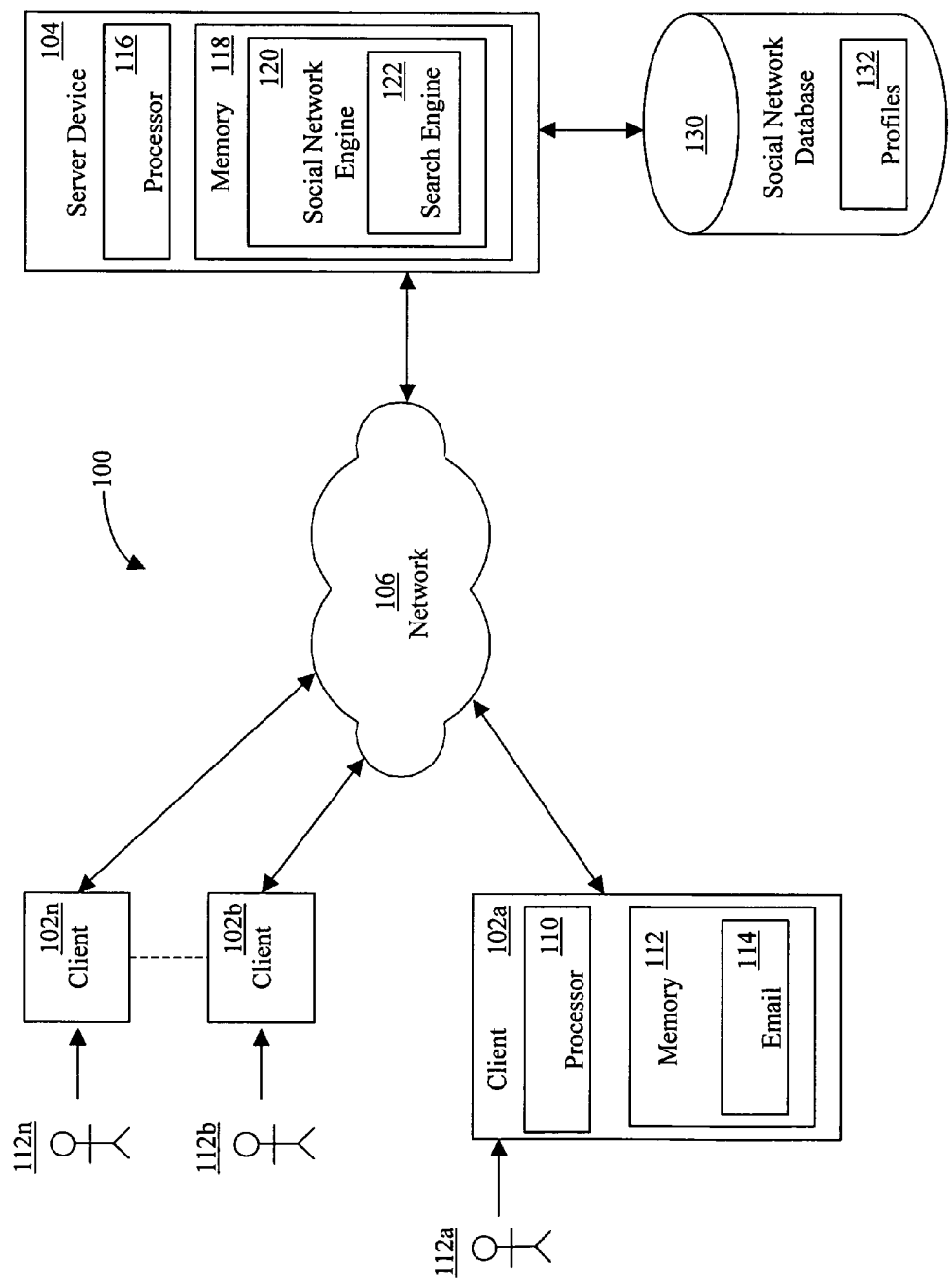
FIG. 1 illustrates a block diagram of an exemplary system in accordance with an embodiment of the present invention.

Various systems in accordance with the present invention may be constructed. FIG. 1 is a diagram illustrating an exemplary system in which embodiments of the present invention can operate. The present invention may operate, and be embodied in, other systems as well.

Referring now to the drawings in which like numerals indicate like elements throughout the several figures, FIG. 1 is a block diagram illustrating a system in accordance with an exemplary embodiment of the present invention. The system 100 shown in FIG. 1 comprises multiple client devices 102*a-n* in communication with one or more server devices 104 over a network 106. In one embodiment, the network 106 shown comprises the Internet. In other embodiments, other networks, such as an intranet, WAN, or LAN may be used. Moreover, methods according to the present invention may operate within a single computer.

The client devices 102a-n shown each comprises a computer-readable medium, such as a random access memory (RAM) 112 coupled to a processor 110. The processor 110 executes computer-executable program instructions stored in memory 112. Such processors may comprise a microprocessor, an ASIC, and state machines. Such processors comprise, or may be in communication with, media, for example computer-readable storage media or computer-readable transmission media, which stores instructions that, when executed by the processor, cause the processor to perform the steps described herein.

Embodiments of computer-readable storage media include, but are not limited to, an electronic, optical, magnetic, or other storage device capable of providing a processor, such as the processor 110 of client device 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other suitable medium from which a computer processor can read instructions. Also, various other forms of computer-readable media such as computer-readable transmission media, may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any suitable type of processor-based platform that is connected to a network 106 and that interacts with one or more application programs. Client devices 102a-n may operate on any suitable operating system capable of supporting a browser or browser-enabled application, such as Microsoft® Windows® or Linux. The client devices 102a-n shown can include, for example, personal computers executing a browser application program such as Microsoft Corporation's Internet Explorer™, Netscape Communication Corporation's Netscape Navigator™, and Apple Computer, Inc.'s Safari™. The member devices 102a-n can also include an email program application 114 to allow the members 112a-n to communicate with each other. Examples of email clients 114 are stand alone email clients such as Microsoft Corporation's Outlook™ or Qualcomm Enterprises' Eudora™, Web page clients such as Microsoft Corporation's Hotmail™, an email reader such as AOL™ and other email clients as known in the art.

Through the client devices 102a-n, members 112a-n can communicate over the network 106 with each other and with other systems and devices coupled to the network 106. As shown in FIG. 1, server device 104 is also coupled to the network 106.

The server device 104 shown comprises a server executing a social network engine application program, also known as a social network engine 120. The social network engine 120 allows users, such as user 112a, to interact with and participate in a social network. A social network can refer to a computer network connecting entities, such as people or organizations, by a set of social relationships, such as friendship, co-working, or information exchange. Of course, a social network can refer to a computer application or data connecting such entities by such social relationships. Examples of social networks include Orkut.com and Friendster.com.

Social networks can comprise any of a variety of suitable arrangements. An entity or member of a social network can have a profile and that profile can represent the member in the social network. The social network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the social network engine 120 can determine the type of association between member profiles, including, in some embodiments, the degree of separation of the association and the corresponding weight or level of the association.

Similar to the client devices 102a-n, the server devices 104 shown comprises a processor 116 coupled to a computer-readable medium, such as a random access memory (RAM) 118. The server device 104 is in communication with a social network database 130. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of suitable computer processors, such as processors from Intel Corporation of Santa Clara, Calif. and Motorola Corporation of Schaumburg, Ill.

Memory 118 contains a social network engine application program, also known as a social network engine 120. The social network engine 120 allows users or members, such as member 112a, to interact act with and participate in a social network. A social network can comprise profiles that can be associated with other profiles. Each profile may represent a member and a member can be, for example, a person, an organization, a business, a corporation, a community, a fictitious person, or other entity. Each profile can contain entries, and each entry can comprise information associated with a profile. Examples of entries for a person profile can comprise information regarding relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines, email addresses, location information, IM name, phone number, residential address, mailing address, skills, career, or any other information describing, identifying, or otherwise associated with a profile. Entries for a business profile can comprise market sector, customer base, location, supplier information, net profits, net worth, number of employees, stock performance, website, business address, mailing address, telephone number, or other types of information associated with the business profile. Additionally, entries within a profile can comprise associations with other profiles. Associations between profiles of a social network can include, for example, friendships, business relationships, acquaintances, community associations, activity partner associations, common interest associations, common characteristic associations, or any other suitable type of association between profiles.

In addition, a member's profile can include a list of blog information associated with each member, authorization indicating the relationships the member is willing to display his or her blog information to, members in specified relationships with the member (e.g., friends, friends of friends, business associations, community associations, and other relationships known in the art), etc. The blog information can include links to one or more blogs associated with each identified member or RSS feeds associated with each associated member.

The social network engine 120 can comprise a search engine 122. The search engine 122 can facilitate the ability to search for blog information associated with members 112b-n of the social network 100 who meet association criterion. The association criterion may define at least one relationship between the first member 112a of the social network and at least one other member 112b-n of the social network 100. The search engine 122 can then search profile information associated for each of the associated members 112b-n who have the specified relationship with the first member 112a to determine if the member 112 has authorized the disclosure of such information. The search engine 122 can search the members' 112b-n profile information or a computer network, e.g., the Internet, for the blog information associated with each of the members 112b-n. The search engine 122 can provide the blog information to one or more members 112 for displaying the blog information on a client device 102 associated with a member 112 or non-member 112 who requested the blog information.

Server device 104 also provides access to storage elements, such as a social network storage element, in the example shown in FIG. 1, a social network database 130. The social network database 130 can store member profiles 132. The member profiles 132 can include each member's entire profile, limited profile information or any combination thereof. Data storage elements may include any one or combination of methods for storing data, including without limitation, arrays, hash tables, lists, and pairs. Other similar types of data storage devices can be accessed by the server device 104. The social network engine 120 can receive data comprising the members profiles 132 from the social network database 130 and can also send data comprising member profiles 132 to the social network database 130 for storage. The social network database 130 may be physically attached or otherwise in communication with the social network engine 120 by way of a network or other connection.

It should be noted that the present invention may comprise systems having different architecture than that which is shown in FIG. 1. For example, in some systems according to the present invention, the server device 104 can comprise a single physical or logical server. In other embodiments, the server device 104 can be single servers, a virtual server, multiple servers, etc. In yet other embodiments, the functions that are performed by the search engine 122 can be performed by the social network engine 120. The system 100 shown in FIG. 1 is merely exemplary, and is used to help explain the social networks and methods illustrated in FIGS. 2-4.

Exemplary Social Network

Figure 2:
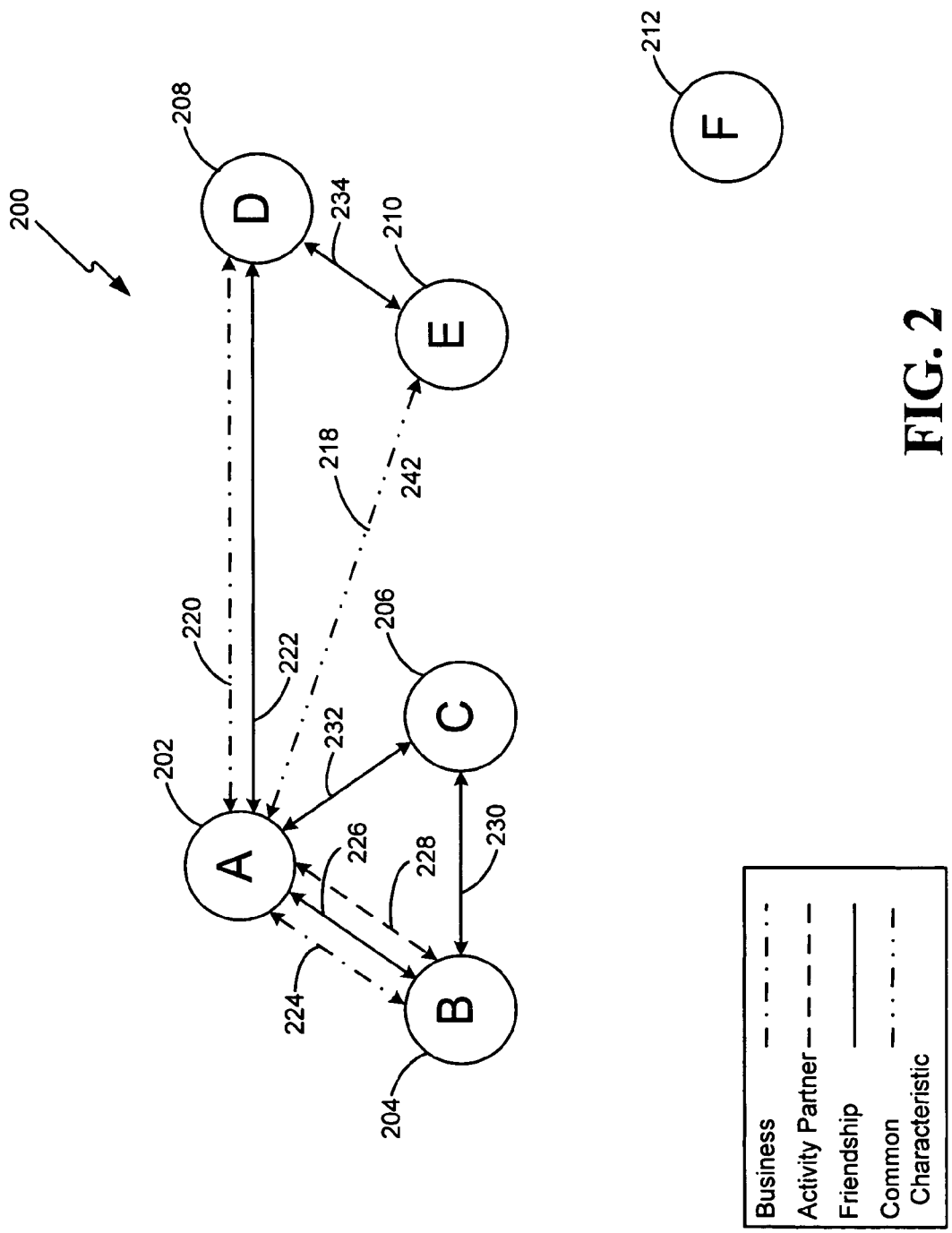
FIG. 2 illustrates one embodiment of a social network in accordance with an exemplary embodiment of the present invention.

FIG. 2 illustrates an exemplary embodiment of a social network 200. According to the embodiment illustrated in FIG. 2, the social network 200 comprises a graph comprising vertices 202-212 and edges 218-234. The vertices 202-212 comprise profiles A-F. Each profile can represent a member. The edges 218-234 comprise associations between profiles. According to the embodiment shown in FIG. 2, the social network 200 comprises a plurality of differing types of associations represented by edges 218-234. The types of associations listed in FIG. 2 for illustration purposes are business associations, activity partner associations, friendship associations, community associations, and common characteristic associations. Common characteristic associations can include associations based on some characteristic such as attending the same high school or being from the same hometown, but can indicate a lower level of significance that another type of association, such as a friendship association. In one embodiment, the social network 200 comprises a single associations, such as a friendship association. One or more associations can have different levels. For example, a friendship association can have the following levels: haven't met, acquaintance, friend, good friend, and best friend.

For example, edge 220 and edge 222 each comprise an association between profile A at vertex 202 and Profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A-F comprising the vertices 202-212, for purposes of illustration is a person. Other types of members can be in social network 200. The associations 220-234 illustrated in FIG. 2 comprise bi-directional associations. The associations are bi-directional because when one profile, for example profile A, is associated with another profile, for example profile D, then profile D is also associated with profile A. In one embodiment, A and D will not be associated with each other until both profiles consent to such association; e.g., A may invite D to be associated therewith, and the association occurs upon D's acceptance of such invitation. The invitation, for example, may include sending an email or other message to D indicating that A has requested an association with D.

Other embodiments of the present invention may comprise directed associations or other types of associations. Directed associations associate a first profile with a second profile while not requiring the second profile to be associated with the first profile. For example, in a directed chart, profile A can be associated by a friendship association with profile B, and profile B can be unassociated by a friendship connection with profile A. Thus a display of profile A's friends would include profile B, but a display of profile B's friends would not include profile A.

Within a social network, a degree of separation can be determined for associated profiles. One method of determining a degree of separation is to determine the fewest number of edges of a certain type separating the associated profiles. This method of determining a degree of separation can produce a type-specific degree of separation. A type-specific degree of separation is a degree of separation determined based on one particular type of association. For example, a profile A has a friend association degree of separation of two from profile E. The fewest number of friendship associations between profile A and profile E is two—the friendship association comprising edge 220 and the friendship association comprising edge 234. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example, can be that profile A attended the same high school as profile E. A common characteristic association may be selected by profiles A and E to represent that they are associated in some fashion, but to not create a close association such as with a friendship association.

According to other aspects of certain embodiments of the present invention, the degree of separation may be determined by use of a weighting factor assigned to each association. For example, "best" friends can be weighted higher than "haven't met" friends. According to certain aspects of embodiments using a weighting factor, a higher weighting factor for an association can reduce the degree of separation between profiles and lower weighting factors can increase the degree of separation. This can be accomplished, for example, by establishing an inverse relationship between each associations and a corresponding weighting factor prior to summing the associations. Thus, highly weighted associations would contribute less to the resulting sum than lower weighted associations.

Process

Various methods in accordance with the present invention may be constructed. The method may begin with receiving a request for blog information associated with a first member 112 of a social network 100. The request may come from a member 112 of the social network 100 requesting the blog information for other members 112 that the member 112 has an association with, e.g., "friends" or members that share interest in a business association or community association. The request may also come from a member 112 who has been asked to form a relationship with another member 112, e.g., a first member 112a asks a second member 112b to become friends within the social network 100, or can come from a non-member 112b who has been asked to join the social network 100 by a member 112a of the social network 100. In order to make the decision, the invited member 112b may want to see blog information for the existing friends 112 of the inviting member 112a to help assist in making a decision. After receiving the request, association criterion associated with the request is identified. The association criterion defines at least one relationship between the first member 112 of the social network 100 and at least one other member 112 of the social network 100. Examples of relationships may be friends, friends of friends, business associations, and community associations. The association criterion may be specified in the request or may be set as a default.

After identifying the association criterion associated with the request, at least one associated member 112 of the social network 100 who meets the identified association may be identified. Profile information associated with the first member 112a may be used to identify the at least one associated member 112. For example, a list of members 112 that have specified relationships with the first member 112a are listed in the in the profile information of the first member 112a. After identifying at least one associated member 112, blog information associated with the at least one associated member 112 may be identified. Once the blog information is identified, a representation of the blog information may be generated. The representation may then be displayed on a client device 102 associated with the person, e.g., member 112, who requested the blog information.

Figure 3:
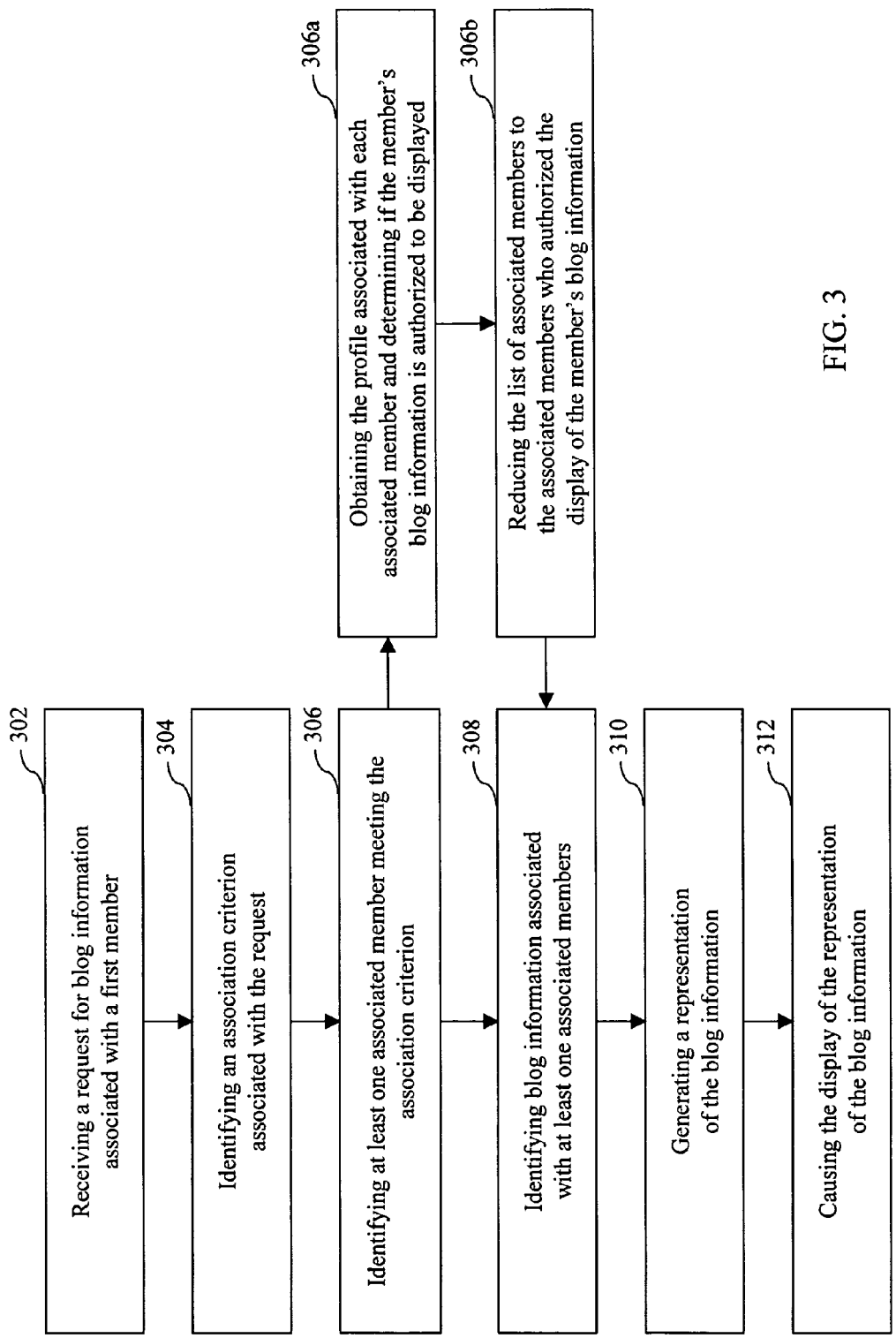
FIG. 3 illustrates a flow diagram of a method in accordance with an exemplary embodiment of the present invention.

FIG. 3 illustrates an exemplary method 300 for providing blog information associated with a member of a social network in accordance with an embodiment of the present invention. This exemplary method is provided by way of example, as there are a variety of ways to carry out methods according to the present invention. The method 300 shown in FIG. 3 can be executed or otherwise performed by one or a combination of various systems. The method 300 is described below as carried out by the system 100 shown in FIG. 1 by way of example, and various elements of the system 100 are referenced in explaining the example method of FIG. 3.

The method 300 begins in block 302 with receiving a request for blog information associated with a first member. For example, the social network engine 120 or social engine 122 may receive the request. The request may come from one of the members 112a-n in the social network 100 (such as member 112a), from a second member 112b-n in the social network 100 (such as member 112b who was invited to become a "friend" of the first member 112a), or from a non-member 112b-n of the social network 100 (such as non-member 112b who was invited to join the social network 100).

After receiving the request, the method 300 proceeds to block 304, wherein an association criterion associated with the request is identified. For example, the social network engine 120 or the search engine 122 receives the request and identifies the association criterion. The association criterion may define at least one relationship between the first member 112a of the social network 100 and at least one other member 112b-n of the social network 100. The request may include association criterion, e.g., friend, friend of friend, business association, community association, etc. The request may include a default association criterion if no association criterion was provided. In one embodiment, a non-member 112b of the social network 100 may request to see the blogs of the friends of the first member 112a who invited a non-member 112b to join the social network 100. In another embodiment, a first member 112a may request to see the blogs of everyone associated with an identified association, e.g., users in a Linux™ community.

After identifying association criterion associated with the request, the method 300 proceeds to block 306, wherein at least one associated member 112 of the social network 100 that meets the association criterion is identified. This may be accomplished using profile information associated with the first member. 112a For example, the social network engine 120 or the search engine 122 obtains profile information associated with the first member 112a and determines which members 112b-n share the identified relationship with the first member 112a.

In one embodiment, after identifying at least one associated member 112 who meets the association criterion, the method 300 proceeds to block 306a, wherein the profile information for each associated member 112 is obtained and the authorization for displaying blog information is determined for each associated member 112. For example, the social network engine 120 or the search engine 122 can obtain the profile information for each associated member 112 and make the authorization determination, e.g., using an authorization parameter in the profile information for each associated member 112. The authorization can authorize no one, friends, friends of friends, business associations, community associations, or other relationships known in the art to see the identified member's blog information.

After determining which associated members 112 have authorized the display of the associated member's blog information, the method proceeds to block 306b, where the identified member list is reduced to only associated members 112 who have authorized such a disclosure. The social network engine 120 or the search engine 122 can reduce the list.

After identifying associated member 112s of the social network 100 who meet the association criterion or those who have been identified and have authorized the disclosure of such information, the method 300 proceeds to block 308, where blog information associated with the at least one associated members 112 is identified. For example, the social network engine 120 or the search engine 122 may search either the profile information associated with each associated member 112 or a computer network, e.g., the Internet, to obtain blog information associated with each associated member 112. The blog information may include links to at least one blog associated with each associated member or to at least one RSS feed associated with each associated member. In one embodiment, the blog information can be links to new blogs or an RSS feed for new entries in blogs.

After identifying the blog information associated with at least one associated member 112, the method 300 proceeds to block 310, where a representation of the blog information is generated. For example, the social network engine 120 or the search engine 122 generates the representation of the blog information.

After generating the representation of the identified blog information, the method 300 proceeds to block 312, where the representation of the blog information is caused to be displayed. For example, the social network engine 120 or the search engine 122 may send the representation to the client device 102 from which the request was sent and causes the blog information to be displayed on the client device 102. If the first member 112a requested the information about his or her friends, the social network engine 120 or the search engine 122 sends the blog information to the first member 112a where the blog information is displayed on the client device 102a associated with the first member 112a. If an invited member 112b requested the blog information about the first member's 112a friends, the social network engine 120 or the search engine 122 sends the blog information to the invited member 112b where the blog information is displayed on the client device 102b associated with the invited member 112b. In one embodiment, the blog information can be displayed as a list. The display of the representation of the blog information can be within the social network 100 or outside the social network 100, e.g., displayed using an RSS reader.

General

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A computer-implemented method comprising:
   transmitting, by a server device to a client device, a first request that a user associated with the client device form a relationship with a first member of a social network;
   responsive to transmitting the first request and prior to a decision by the user whether to form the relationship with the first member, receiving, by the server device from the client device, a second request for blog information of members of the social network associated with the first member;
   identifying, by the server device, an association criterion associated with the second request, the association criterion defining at least one relationship between the first member of the social network and at least one other member of the social network;
   identifying, by the server device, a plurality of associated members of the social network meeting the association criterion;
   identifying, by the server device, blog information associated with each of the plurality of associated members; and
   transmitting, by the server device to the client device, the identified blog information for each of the plurality of associated members, the client device displaying the identified blog information.

2. The method of claim 1 wherein identifying, by the server device, a plurality of associated members of the social network meeting the association criterion comprises using profile information associated with the first member.

3. The method of claim 1 wherein each of the plurality of associated members has authorized the display of the associated blog information.

4. The method of claim 1 wherein identifying, by the server device, blog information associated with each of the plurality of associated members comprises for each of the plurality of associated members searching profile information associated with each of the plurality of associated members to identify blog information associated with each of the plurality of associated members.

5. The method of claim 1 wherein identifying, by the server device, blog information associated with each of the plurality of associated members comprises searching a computer network for blog information associated with each of the plurality of associated members.

6. The method of claim 1 wherein the blog information further comprises one of at least one link to a blog associated with one of the plurality of associated members, a RDF Site Summary (RSS) feed associated with the associated member.

7. The method of claim 1 wherein the association criterion comprises one of friends, friends of friends, business associations, and community associations.

8. The method of claim 1 wherein the second request comprises one of a specified relationship and a default relationship.

9. A computer-readable medium on which is encoded program code comprising:
- program code for transmitting, by a server device to a client device, a first request that a user associated with the client device form a relationship with a first member of a social network;
- program code for, responsive to transmitting the first request and prior to a decision by the user whether to form the relationship with the first member, receiving, by the server device from the client device, a second request for blog information of members of the social network associated with the first member;
- program code for identifying, by the server device, an association criterion associated with the second request, the association criterion defining at least one relationship between the first member of the social network and at least one other member of the social network;
- program code for identifying, by the server device, a plurality of associated members of the social network meeting the association criterion;
- program code for identifying, by the server device, blog information associated with each of the plurality of associated members; and
- program code for transmitting, by the server device to the client device, the identified blog information for each of the plurality of associated members, the client device displaying the identified blog information.

10. The computer-readable medium of claim 9 wherein identifying, by the server device, a plurality of associated members of the social network meeting the association criterion comprises using profile information associated with the first member.

11. The computer-readable medium of claim 9 wherein each of the plurality of associated member has authorized the display of the associated blog information.

12. The computer-readable medium of claim 9 wherein identifying, by the server device, blog information associated with each of the plurality of associated members comprises program code for searching profile information associated with each of the plurality of associated members to identify blog information associated with each of the plurality of associated members.

13. The computer-readable medium of claim 9 wherein identifying, by the server device, blog information associated with each of the plurality of associated members comprises program code for searching a computer network for blog information associated with each of the plurality of associated members.

14. The computer-readable medium of claim 9 wherein the blog information further comprises one of at least one link to a blog associated with one of the plurality of associated members, a RDF Site Summary (RSS) feed associated with the associated member.

15. The computer-readable medium of claim 9 wherein the association criterion comprises one of friends, friends of friends, business associations, and community associations.

16. The computer-readable medium of claim 9 wherein the second request comprises one of a specified relationship and a default relationship.

17. A method for providing access to information of a subset of members of a social network, comprising:
- transmitting, by a server device to a client device, a first request that a user associated with the client device form a relationship with a first member of a social network;
- responsive to transmitting the first request and prior to a decision by the user whether to form the relationship with the first member, receiving, by the server device from the client device, a second request for information of members of the social network associated with the first member;
- identifying, by the server device, an association criterion associated with the second request, the association criterion defining at least one relationship between the first member of the social network and at least one other member of the social network;
- identifying, by the server device, a plurality of associated members of the social network meeting the association criterion;
- identifying, by the server device, information associated with each of the plurality of associated members; and
- transmitting, by the server device to the client device, the identified information for each of the plurality of associated members, the client device displaying the identified blog information.

18. The method of claim 1 wherein the user is not a member of the social network.

19. The method of claim 1 wherein the user is a member of the social network.

20. The computer-readable medium of claim 9 wherein the user is not a member of the social network.

21. The computer-readable medium of claim 9 wherein the user is a member of the social network.

* * * * *

UNITED STATES PATENT AND TRADEMARK OFFICE
CERTIFICATE OF CORRECTION

| | | |
|---|---|---|
| PATENT NO. | : 7,613,769 B1 | Page 1 of 1 |
| APPLICATION NO. | : 10/954146 | |
| DATED | : November 3, 2009 | |
| INVENTOR(S) | : Duane Scott Hess | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 950 days.

Signed and Sealed this

Nineteenth Day of October, 2010

David J. Kappos
*Director of the United States Patent and Trademark Office*